United States Patent
Davies et al.

(10) Patent No.: US 6,316,511 B1
(45) Date of Patent: Nov. 13, 2001

(54) POLYETHYLENE CLOSURE FOR A CONTAINER

(75) Inventors: Kelvin Allan Davies, Coburg; Roland David South, Mosman, both of (AU)

(73) Assignee: Southcorp Australia Pty. Ltd., Adelaide (AU)

( * ) Notice: Subject to any disclaimer, the term of this patent is extended or adjusted under 35 U.S.C. 154(b) by 0 days.

(21) Appl. No.: 09/463,899

(22) PCT Filed: Jul. 30, 1998

(86) PCT No.: PCT/AU98/00605

§ 371 Date: Apr. 18, 2000

§ 102(e) Date: Apr. 18, 2000

(87) PCT Pub. No.: WO99/06293

PCT Pub. Date: Feb. 11, 1999

(30) Foreign Application Priority Data

Jul. 31, 1997 (AU) .................................................. PO 8329

(51) Int. Cl.$^7$ .................................................. C08F 10/02
(52) U.S. Cl. .......................... 521/143; 521/140; 521/144; 521/124
(58) Field of Search ............................. 521/51, 140, 142, 521/143, 144, 124

(56) References Cited

U.S. PATENT DOCUMENTS

5,723,507 * 3/1998 Markovich et al. .................... 521/51
6,008,262 * 12/1999 MacKay et al. ........................ 521/51

FOREIGN PATENT DOCUMENTS

711738    10/1997 (AU) .

* cited by examiner

*Primary Examiner*—James J. Seidleck
*Assistant Examiner*—Melanie D. Bagwell
(74) *Attorney, Agent, or Firm*—Wolf, Greenfield & Sacks, P.C.

(57) ABSTRACT

A polymeric closure for a container comprising a foamed polyethylene, wherein said polyethylene prior to foaming has: 1) a density of between 0.910 g/cm$^3$ and 0.885 g/cm$^3$; ii) a molecular weight distribution of 2 or less; and iii) a melt index of between 2 and 10. Closure can be used as a replacement of natural cork for wine bottles.

9 Claims, 3 Drawing Sheets

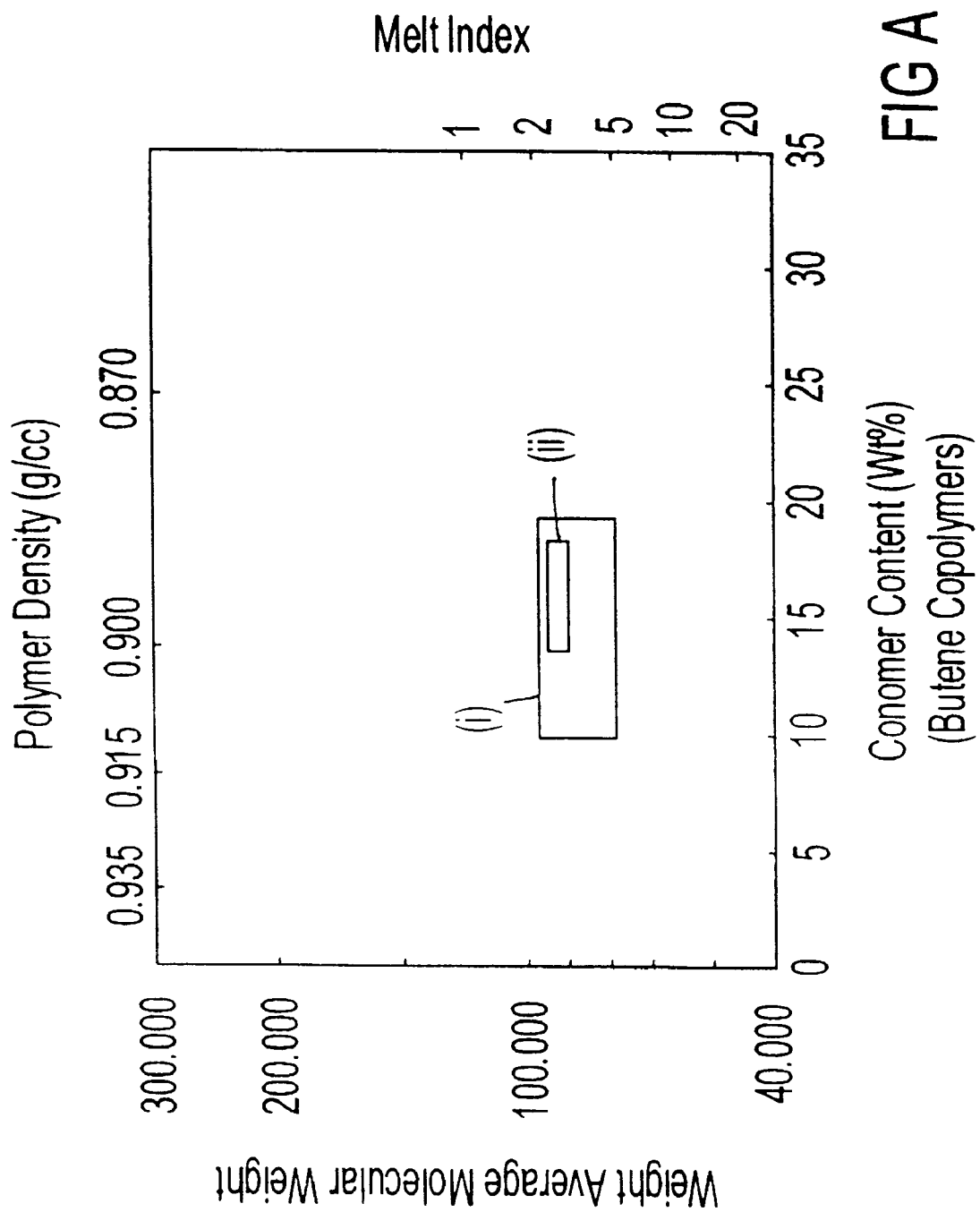

POLYETHYLENE CLOSURE FOR A CONTAINER

FIELD OF THE INVENTION

The present invention relates to a polymeric closure for a container. It will be convenient to describe the invention with reference to use as a closure for bottles, in particular, wine bottles, however it should be noted that the invention may have wider application.

BACKGROUND OF THE INVENTION

Natural cork has been used as a closure for bottles containing wine and other liquids for many years. Due to its resilience, elastic properties, water impermeability and, in earlier times, low cost, cork is widely used throughout the wine industry worldwide for sealing bottles.

Availability of cork has in recent time decreased due to more widespread demand and limited supply. However, cork quality has also become a concern to wine producers as a result of undesirable reactions between the cork and the wine. Problems from cork taint are estimated to be as high as 6% of all bottled wine. One form of cork taint occurs when trichloroanisole (TCA) present in the cork migrates into the wine giving rise to "off" flavours. The costs involved have become an unacceptable burden on wine producers. Accordingly, there is a need for an inexpensive alternative to natural cork, which has no such reaction with wine.

A number of synthetic closures are presently available on the market. One type of closure comprises a substantially cylindrical polymeric body having radial resilient flanges along the length of its shank adapted to seal about the inside neck of a container, and a crown which overlies the bottle opening. Such closures are commonly used for sparkling wines. A disadvantage of such closures is that they require special corking machinery for their insertion into bottles and they cannot be utilised in an unmodified bottling operation.

Other types of polymeric closures available are generally identical in size and shape to conventional corks and can be utilised in standard bottling operations without needing to modify machinery. One group of known polymeric closures are manufactured from foamed ethylene vinylacetate (EVA) copolymer. The polymer is generally foamed with a foaming agent such as azodicarbonamide (ABFA) or ozodecarbonoxide. Other polymers have also been proposed for use for such closures. Closures made from Linear Low Density Polyethylene (LLDPE) blended with ionomers have also been disclosed.

The polymeric stoppers known in the art suffer from a number of disadvantages primarily as a result of the polymeric material from which they are made. First, the EVA polymers which have the desired flexural properties may exhibit some odour or flavour taint which may affect the contents of the bottle and EVAs which do not exhibit taint are not likely to have the desired flexural properties. The foaming agents suftable for use with EVAs similarly may demonstrate some flavour or odour taint of the contents of the bottle which they are sealing. EVAs are also prone to degradation during manufacture of a closure.

Polyvinylchlorides (PVCs) and ionomers are unsuitable as they impart undesirable taint to the wine.

LDPEs including LLDPEs although they do not impart significant undesirable tastes to the wine, do not have adequate flexural properties in particular, inadequate elastic recovery in order to form an adequate seal.

Accordingly there is a need for a polymeric closure for a container which satisfies many or most of the following performance criteria:

a) Does not impart any taint to the contents of the container, especially where such contents are wine;

b) Does not scalp any flavours from the contents of the container to any significant extent;

c) Has suitable flexural properties such that it can be adequately deformed and inserted into the opening of the container, yet will recover sufficiently to maintain a long-term fluid impermeable seal between the closure and the container d) Can be removed in one piece from said container when desired using conventional apparatus, such as a corkscrew, without structural failure e) Can be coloured to resemble natural cork and optionally printed upon f) Can be used in conventional corking machinery g) Can be mass produced cost effectively.

"Scalp" refers to the undesirable tendency of some substances to extract flavours from a liquid. it is an object of the present invention to provide a polymeric closure which meets one or more of the above performance criteria.

SUMMARY OF THE INVENTION

In one aspect of the invention there is provided a polymeric closure for a container comprising a foamed polyethylene, wherein said polyethylene has:

i) a density of between 0.910 g/cm$^3$ and 0.885g/cm$^3$;

ii) a molecular weight distribution of 2 or less; and iii) a melt index of between 2 and 30, more preferably between 2 and 10.

In another embodiment there is provided a polymeric closure for a container comprising a foamed polyethylene, wherein said polyethylene consists of a blend of two or more polyethylenes, each polyethylene having:

i) a density of between 0.910 g/cm$^3$ and 0.885 g/cm$^3$;

ii) a molecular weight distribution of about 2 or less; and iii) a melt index of between 2 and 30.

Even more preferred polyethylenes of the present invention are selected from polyethylenes having:

i) a density of between 0.900 g/cm$^3$ and 0.888 g/cm$^3$;

ii) a molecular weight distribution of 2 or less; and iii) a melt index between 2.2 and 3.5, or a blend of 2 or more polyethylenes having these properties.

Melt index, being the viscosity of the polymer at a specified temperature and pressure is determined by ASTM D-1238, and is a function of the molecular weight of the polymer.

The polyethylenes selected in the present invention display all the desirable characteristics for container closures, especially those used in wine bottles, namely high thermal stability and resistance to degradation during processing and storage, no off tastes or odours, no tendency to "scalp" and very good elastic recovery. The polyethylenes utilised in the present invention are superior to LDPEs or LLDPEs in that they exhibit far better elastic recovery. Commonly known LLDPEs have a hardness, Shore D, of between 55 to 58 which is too hard to mimic the properties of natural cork, whereas the selected polyethylenes have a Shore D hardness of between 20–50.

Preferably the selected polyethylenes are formed by polymerisation of comonomers using a metallocene-catalyst, alternatively known as a constrained geometry catalyst or single site catalyst. The advantage of such catalysts is that they enable the performance characteristics of the polyethylene to be far better controlled giving rise to a narrower molecular weight distribution range and a lower density range that is otherwise achievable with low density polyethylenes. The narrow molecular weight distribution of the selected polyethylenes gives rise in part to the properties desired. The molecular weight distribution (MWD) of the selected polyethylenes is calculated as $$M_W/M_N$$

where $M_W$=weight average molecular weight; and $M_N$=number average molecular weight Absence of high and low molecular weight species in the selected polyethylenes gives rise to decreased or eliminated taint characteristics, more controllable peak melting points, a narrower melting range, higher tensile strength and improved flexibility and elasticity. High tensile strength and elastic recovery is important for extraction of the closure form a bottle. Preferably the flexural modulus of the selected polyethylenes is generally in the range of 2 to 15 kpsi.

Furthermore, due to their saturation, i.e., absence of chemical double bonds, the selected polyethylenes have superior chemical stability when compared to other polymers.

The range of polyethylenes selected for use in the present invention are illustrated in FIG. A.

The selected polyethylenes of the present invention have physical properties defined within area (i). More preferably the selected polyethylenes have physical properties defined within area (ii).

The closure of the present invention is preferably cylindrical in shape and of similar dimensions to known cork stoppers for sealing wine bottles. It is preferred that the density of the foamed polyethylene is not uniform throughout the stopper, but consists of a less dense core and a more dense outer skin. In a preferred method of manufacturing the stopper of the present invention the preferred distribution of foam density occurs automatically a s result of the foaming dynamics.

A method of making the closure of the present invention is as follows:

A mixture of the selected polyethylene and a suitable blowing agent is heated to a temperature above the melting temperature of the polymer but below the foaming temperature of the foaming agent. The heated mixture is then injected under pressure along a runner in a mould, the runner being of such dimensions that when the mixture is forced under pressure along the runner, shearing forces acting both between adjacent polymer chains and between the walls of the runner and polymer chains frictionally heat the mixture to a temperature above the foaming temperature of the foaming agent. Temperature rise resulting from such shearing forces may be in the order of between about 300° C. and 900° C. Heating the melt by virtue of shearing forces is possible by virtue of the low melt index of the selected polyethylenes. If the heated mixture is kept under pressure it will not foam until the melt reaches the mould cavity whereupon entry into the void of the cavity will allow the foaming agent to decompose to foam the polymer. Preferably the foaming agent is an endothermic foaming agent such as preparations with carbonate components and polycarbonic acid. An advantage of using an endothermic foaming agent is that once the mixture is passed into the mould cavity whereupon it can foam, the foaming process absorbs heat from the heated polymer and thus promotes quicker solidification of the outside walls of the foamed article in the cavity and thus reduces cycle times. Furthermore, as the runner walls act in part to frictionally heat the polymer mixture, it is not necessary for the runner to heated as is commonly required in other injection moulding processes. One of the advantages in using a carbonic acid based foaming agent is that its decomposition products are predominantly carbon dioxide and water which are natural components of wine and as such will not contaminate the wine.

After moulding it is preferable that the surface of the closure is heat treated to obtain desirable surface properties. After a closure is removed from a mould and further cooled the exterior surface of the closure has a somewhat rough textural appearance. In order to smooth the surface it is exposed to a brief heat treatment to locally melt the surface which acts to level out the roughness and causes the surface to take on a glossy appearance. The preferred average glossiness as determined by the standard method of testing gloss of a surface as will be known in the art is between 6 to 16%, more preferably between 12 and 14%.

The heat treatment may be achieved by one of a gas flame, hot air, infra-red radiation or other heating methods. In a preferred embodiment only the cylindrical surfaces and not the ends of the closure are heat treated.

A further advantage of the preferred process is that the only parameters which need be monitored during the injection moulding are the pressure applied to the reservoir of heated polymer and shot size. In conventional injection moulding of foamed articles the reservoir containing the mixture of polymer and foaming agent is heated above the foaming temperature of the foaming agent but kept under pressure in order to prevent foaming from occurring. During the injection step a valve gate is opened to allow flow of the heated mixture out of the reservoir to the mould inlet whereupon a second valve gate is opened to allow flow into the mould cavity. Such an arrangement requires relatively precise adjustment of factors such as temperature, pressure, timing of gates which must be constantly monitored during injection moulding cycles and adds considerably to cost of manufacture. With the preferred process however, only the injection pressure and shot size needs to be carefully monitored. A second valve gate of the cavity is not required.

It will now be convenient to describe the invention with reference to an example and drawings. It should be noted that the following description, example and drawings relate to a preferred embodiment only and are not intended to limit the generality of the invention.

BRIEF DESCRIPTION OF THE DRAWINGS

FIG. A is a chart showing the range of polyethylenes selected for use in the present invention.

DETAILED DESCRIPTION

Figure 1:
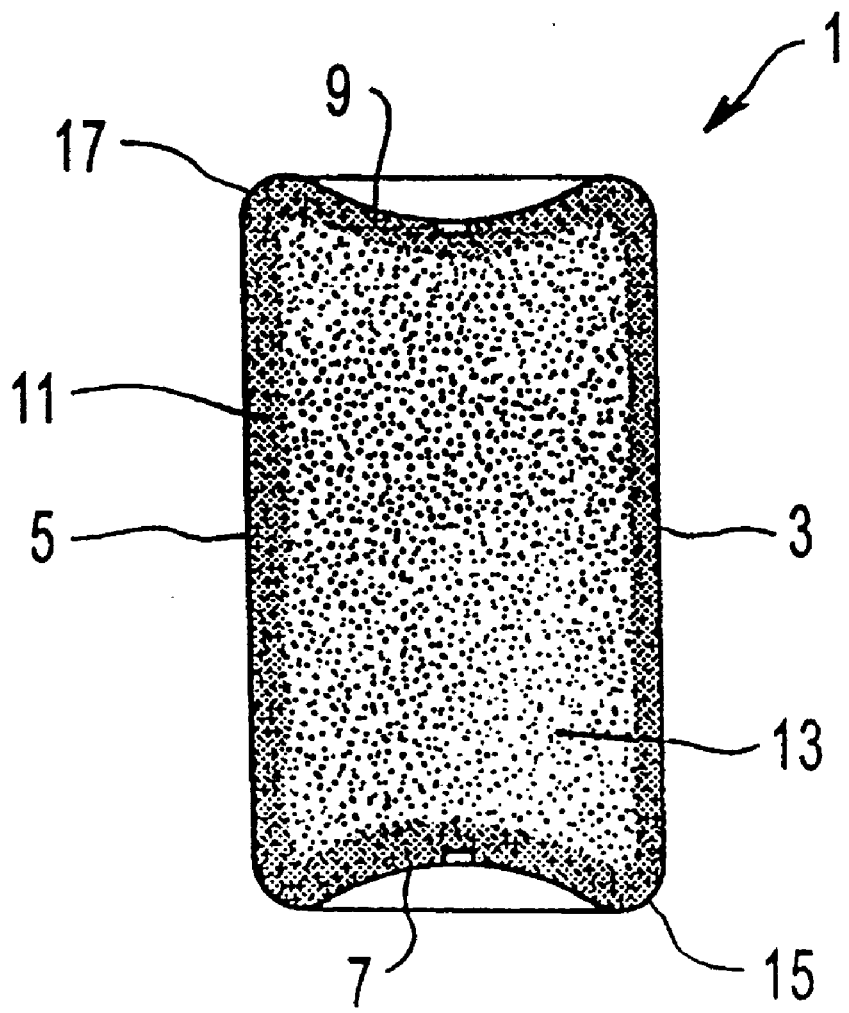
FIG. 1 is a drawing of a closure of the present invention shown in longitudinal section.

In FIG. 1 closure 1, shown in longitudinal section, consists of a cylindrical body having side walls 3, 5, and ends 7, 9, sidewalls 3, 5 contacting and sealing against the neck of a bottle into which the closure is inserted. Region 11 consists of foamed polyethylene which is in a more dense foamed arrangement than core 13. Region 11 essentially is in the form of a skin which envelopes core 13. Annular chamfered portions 15, 17 aid insertion of closure 1 into a bottle neck during bottling operations.

Figure 2:
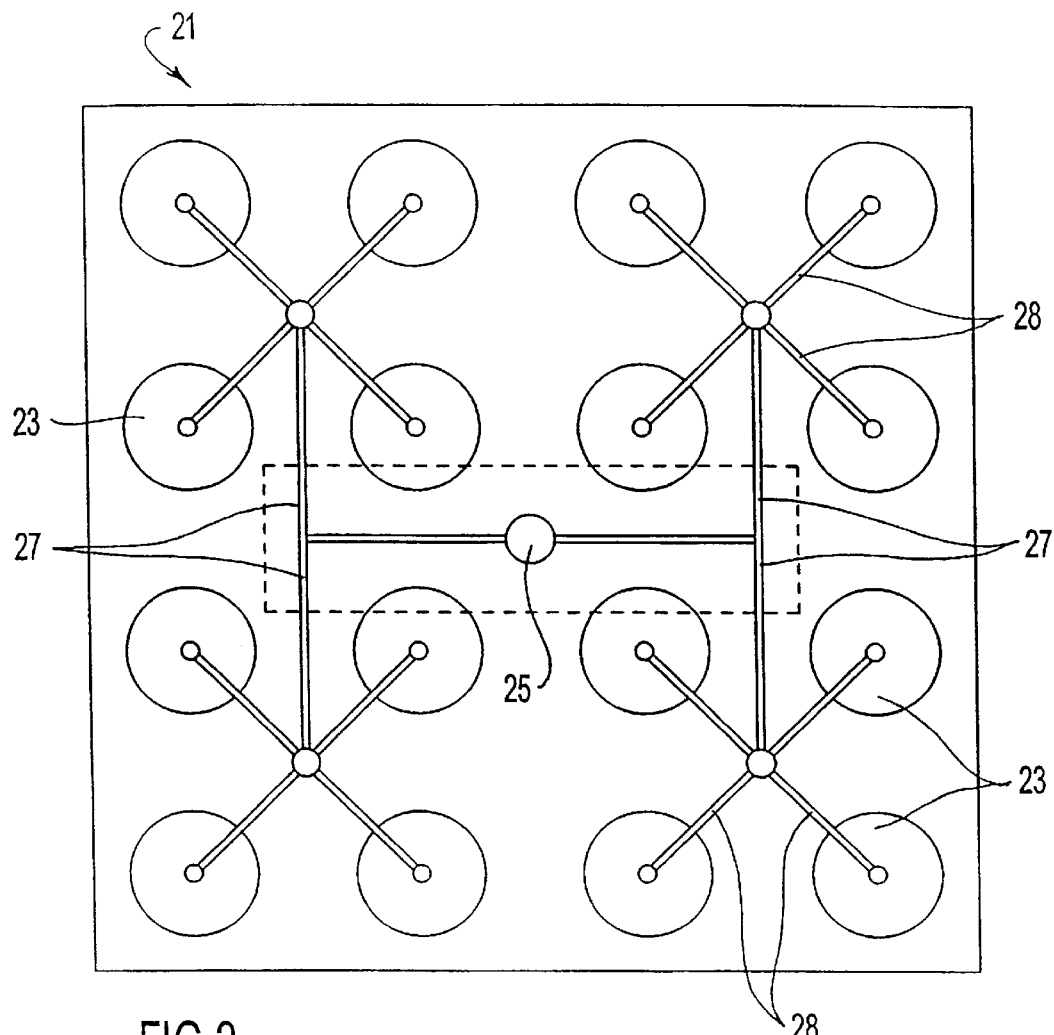
FIG. 2 is a plan view of an injection mould suitable for use in the present invention.
Figure 3:
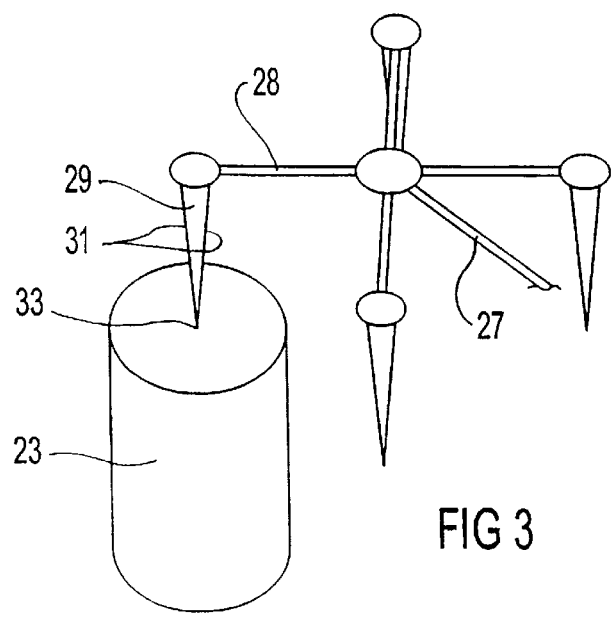
FIG. 3 is a perspective view of a runner and cavity arrangement of a portion of the mould of FIG. 2.

Turning to FIG. 2, mould 21 may be a three-plate mould as is known in the art. Mould 21 is shown having sixteen cavities 23 although it will be appreciated that the mould may have a different number of cavities as desired. Each cavity has internal dimensions corresponding to the diameter required to form an effective seal with the internal diameter of the bottle neck. Sprue 25 is located at a convenient point in mould 21 and is adapted to form a fluid connection with the injection nozzle of a conventional injection moulding machine (not shown). Sprue 5 leads to capillary runners 27, 28 & 29 which allow flow of the polymer melt from sprue 5 to cavities 23. The design of capillary runners 28 is such that when the polymer melt is injected under pressure along capillary runner 28, it is subjected to high shear forces. In one embodiment of the invention, the diameter of capillary runner 28 may be between 1 and 4 mm. More preferably, the diameter of capillary runner 28 may be about 2 mm.

Capillary runner 27 branches into multiple capillary runners 28 equivalent to the number of cavities. The junction between each capillary runner 28 and cavity 23 is preferably via runner 29 which may have tapering side walls 31 leading to a restricted opening 33 which is preferably positioned in a central portion of the top of a cavity 23. Restricted opening 33 may have a diameter less than that of capillary runner 27. The diameter of the restricted opening 33 may be about 1.0 mm. In any event, the diameter of restricted opening 33 should be such that after the polymer melt has been injected into the mould and has at least partially cooled, material in the runner may easily be stripped from the moulded part.

The preferred process for making a closure of the present invention will now be described in relation to the following example.

EXAMPLE 1

A mixture of the following ingredients is prepared:

| | |
|---|---|
| A blend of equal parts of 2 polyethylene grades, one grade having a density of 0.888 g/cm$^3$ and a melt index of 2.2, the other grade having a density of 0.900 g/cm$^3$ and a melt index of 3.5 | 95% or greater by weight |
| foaming agent | about 2 to about 0.8% by weight |
| colouring pigments | 0 to 1% or less |

A suitable foaming agent is "Hydrocerol BIH" available from Boehringer Ingelheim Pty Ltd. HYDROCEROL is a registered trade mark.

The mixture is heated in a standard injection moulding machine to between 130–200° C. and mixed in the barrel of the machine. At this temperature, the polymer melt is below the activation temperature of the blowing agent. Material is then injected into the die using machine pressure of between about 50 to 500 MPa in order to shear heat the resin along the capillary runner to a temperature above the activation temperature of the blowing agent. The polymer melt travels along the capillary runner and foaming along the runner is suppressed by the pressure applied to the polymer melt by the moulding machine. Foaming does not begin to any significant extent along the runner until the polymer melt enters the cavity. Once inside the cavity the blowing agent, now heated above its activation temperature, foams the polymer to fill the cavity void forming the closure. Using machine pressure to maintain a short injection time (generally less than 5 seconds) about 7–8 grams of polymer is deposited into each cavity prior to it being filled by the foaming process.

Chilled water may be passed through the die to cool the newly formed closure cavity. Furthermore, as the foaming of the carbonic acid is endothermal, this aids in cooling the closure. An outer skin forms on the wall of the cavity leaving a core of foamed polyethylene. After a suitable cooling time, the closure is ejected from the cavity using any suitable means. Polymer remaining in the runner may be stripped from the formed part leaving minimal surface imperfections in the part. Polymer remaining in the runner may be re-ground and recycled for re-use in subsequent injection moulding cycles.

After ejection from the mould cavity the closure is then further cooled over an air bed. Cooling is controlled so as to achieve even, quick and consistent cooling.

The cylindrical surface of the closure, once cooled, is then heat treated by methods known in the art to achieve a substantially uniform glossiness on those surfaces of between 6 and 16% and to facilitate printing.

Prior to use the closure is further treated to apply a lubricant, preferably a silicone oil lubricant to facilitate insertion into a bottle neck. The applicant has found that a most preferred method of dosing the closure with lubricant is by way of printing via a VIDEOJET ink application system using a low viscosity lubricant VIDEOJET is a registered trade mark. This preferred method applies a precise dose of lubricant to the closure about the side walls of the closure which are to come into contact with the bottle neck. It is not necessary to apply lubricant to the ends of the closure.

It will be appreciated that the above mentioned method may be suitable for use in manufacture of other foamed articles and is not restricted solely to manufacture of "synthetic corks". Various modifications , additions and/or alterations may be made to the parts previously described without departing from the ambit of the present invention.

What is claimed is:

1. A polymeric closure for a container having a neck, said closure including a substantially cylindrical external surface adapted to form a fluid-tight seal against a corresponding substantially cylindrical internal surface of said neck, and comprising a foamed polyethylene, wherein said foamed polyethylene prior to foaming is formed from at least one polyethylene comprising:

i) a density between 0.910 g/cm$^3$ and 0.885 g/cm$^3$;
   ii) a molecular weight distribution of 2 or less; and
   iii) a melt index between 2 and 30.

2. The polymeric closure of claim 1, wherein said at least one polyethylene prior to foaming comprises a blend of two or more polyethylenes, each of the two or more polyethylenes having:

i) a density of between 0.910 g/cm$^3$ and 0.885 g/cm$^3$;
   ii) a molecular weight distribution of about 2 or less; and
   iii) a melt index of between 2 and 30.

3. A polymeric closure for a container according to claim 1 or 2 wherein the polyethylene or polyethylenes prior to foaming have:

i) a density of between 0.900 g/cm$^3$ and 0.888 g/cm$^3$;
   ii) a molecular weight distribution of 2 or less; and
   iii) a melt index of between 2.2 and 3.5.

4. A polymeric closure according to claim 1 or 2 wherein said polyethylene or polyethylenes are formed by polymerisation of comonomers using a metallocene-family catalyst.

5. A polymeric closure according to claim 1 wherein the flexural modulus of the polyethylene or polyethylenes prior to foaming is between 2 and 15 kpsi.

6. A polymeric closure according to claim 1, wherein the closure is adapted to seal a wine bottle.

7. A polymeric closure according to claim 1, wherein a majority of an exterior surface of the closure has an average glossiness of between 6 to 16%.

8. A polymeric closure according to claim 7 wherein the majority of the exterior surface has an average glossiness of between 12 to 14%.

9. A polymeric closure according to claim 6 having a cylindrical surface and wherein an average glossiness of the cylindrical surface of the closure is between 12 to 14%.

* * * * *